Dec. 4, 1962
C. C. PATTON
3,067,362
SECONDARY POWER CAPACITORS
Filed Dec. 11, 1958
3 Sheets-Sheet 1
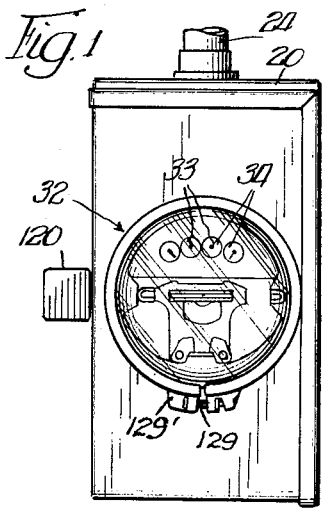
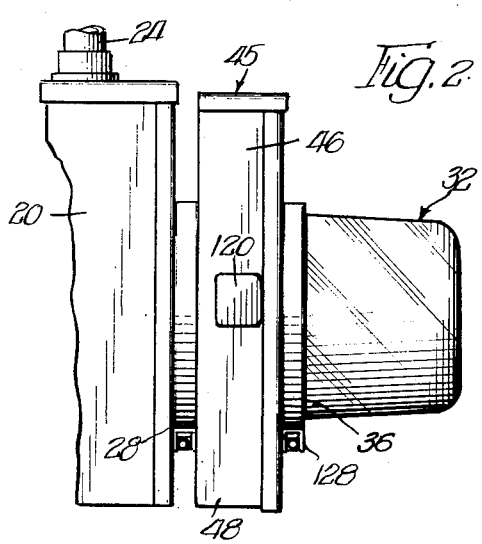
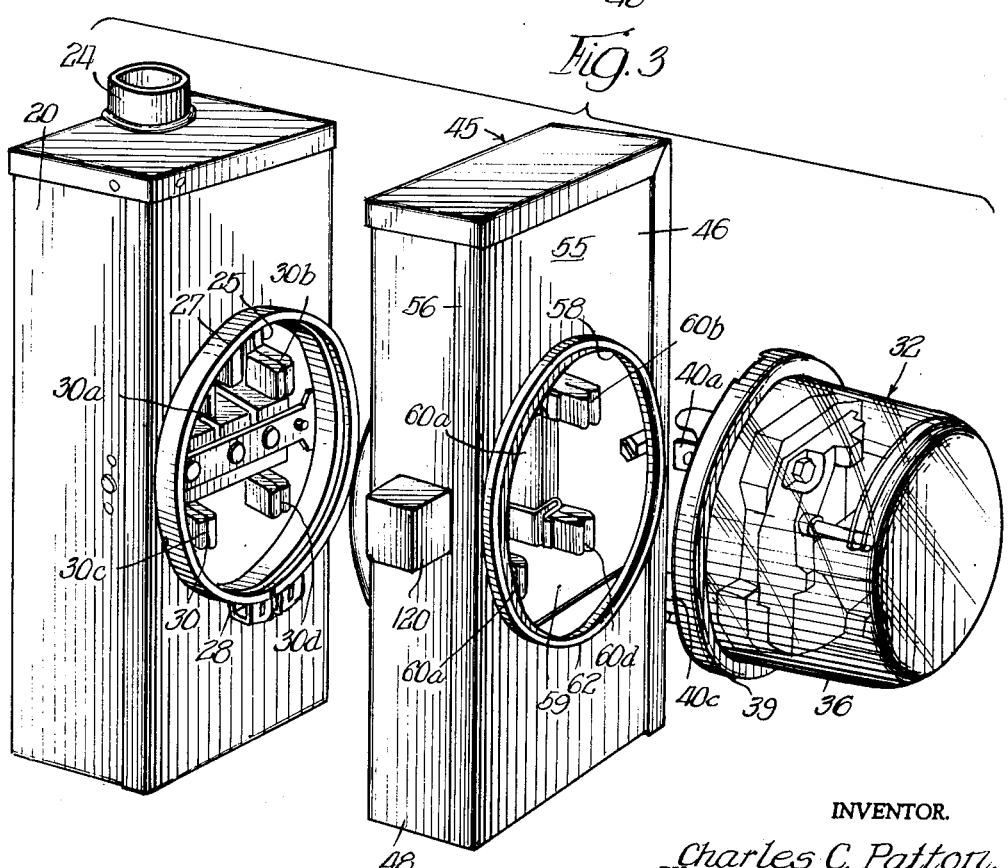
INVENTOR.
Charles C. Patton,
BY Brown, Jackson,
Boettcher & Dienner
Attys.

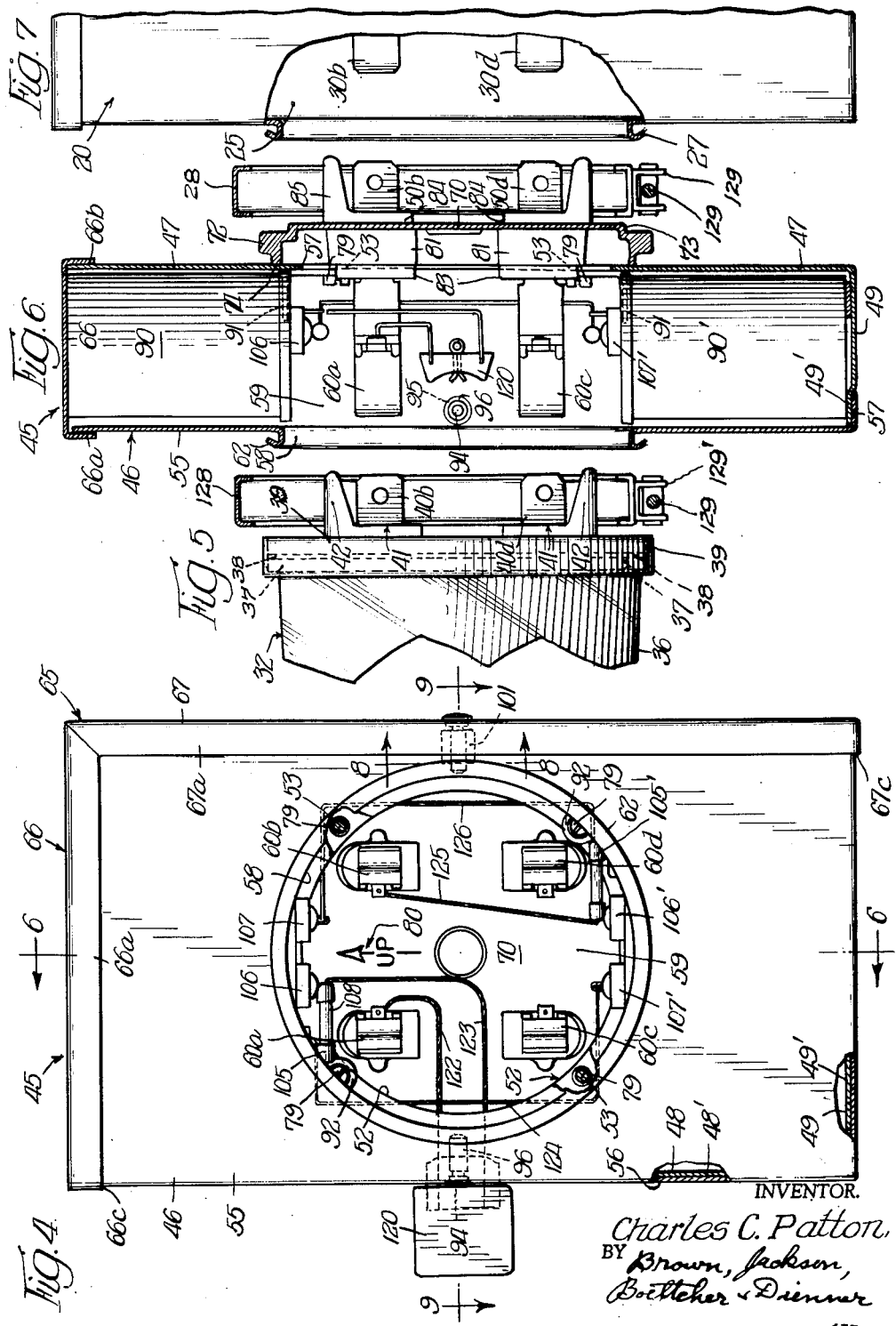

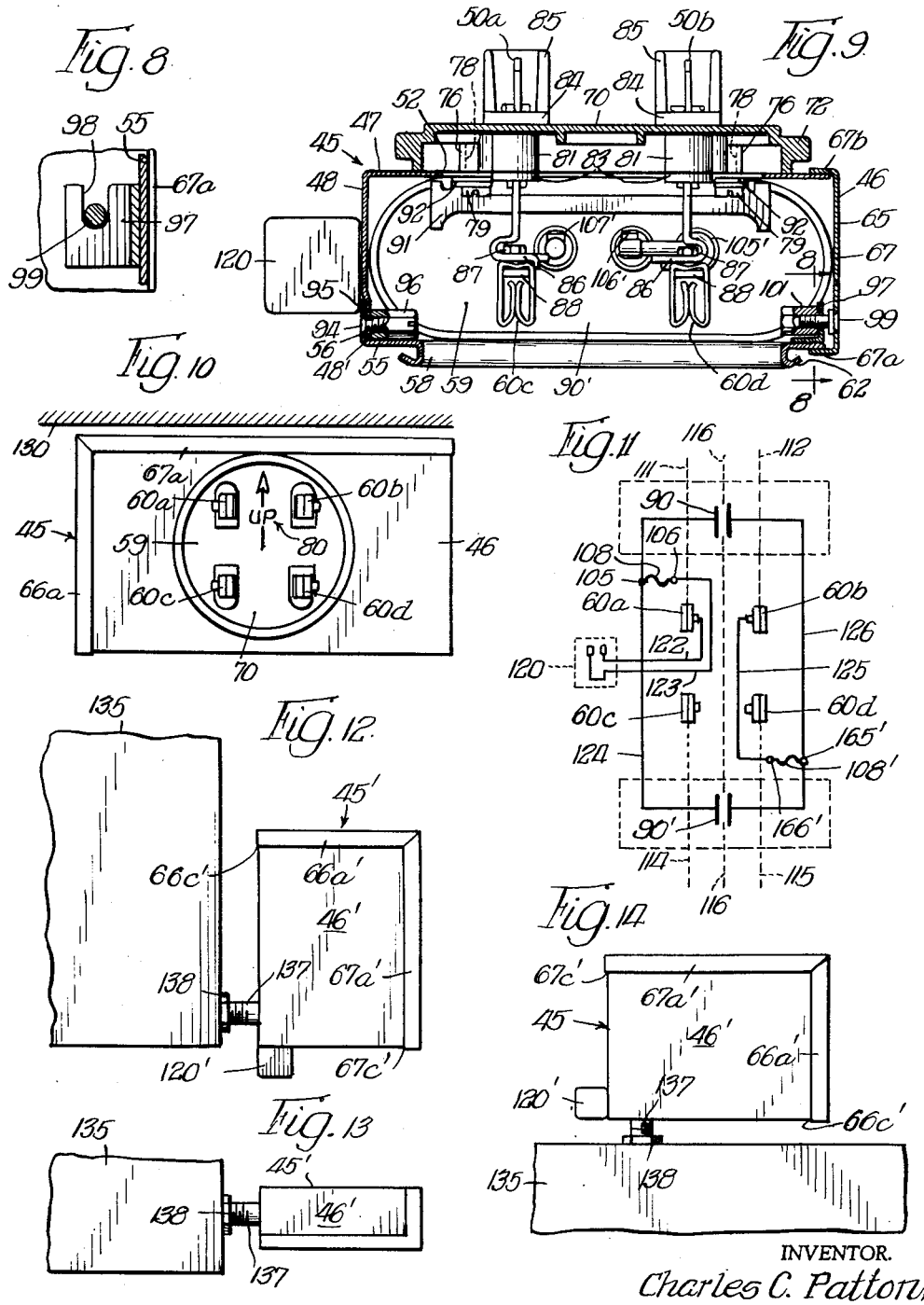

United States Patent Office 3,067,362
Patented Dec. 4, 1962

3,067,362
SECONDARY POWER CAPACITORS
Charles C. Patton, Springfield, Ill., assignor, by mesne assignments, to Sangamo Electric Company, Springfield, Ill., a corporation of Delaware
Filed Dec. 11, 1958, Ser. No. 779,634
7 Claims. (Cl. 317—104)

The present invention relates to a secondary power capacitor for improving the power factor on the secondary service lines leading from the secondary of a distribution transformer to the premises of the consumer.

The increased use of air conditioning apparatus and numerous other motor driven types of apparatus in households, stores, small plants, etc., all of which apparatus draws lagging power factor loads, has created a condition on the electric utility lines where it pays to add power factor correction capacitors. Under such conditions, the use of capacitors will reduce the total line current, reduce losses in lines and transmission equipment, and help to maintain an adequate voltage at the premises of the consumer.

At the present time, much of the power factor correction is effected by the installation of capacitors on the primary sides of the distribution transformers. While the number of capacitor installations required on the primary sides of distribution systems or networks is considerably smaller than the number of capacitor installations required on the secondary sides of these same distribution systems, nevertheless, the capacitor installations on the primary sides are at a much higher voltage; also they come in larger units; and they furthermore require an appreciable amount of labor to install. Moreover, a capacitor installation on the primary side is of no benefit insofar as the distribution transformer and secondary lines are concerned.

On the other hand, a capacitor installation on the secondary side can be located in immediate proximity to the load, or in much closer proximity than can a capacitor installation on the primary side, with maximum benefit in reducing I²R losses and voltage drops throughout the entire system.

While the advantages of using power factor correction capacitors on the secondary sides of distribution systems has long been apparent, one of the deterrents has been the higher cost of labor required to effect the installation of the larger number of secondary side installations which are required, thereby making the total installed cost per kilovar higher for secondary side capacitors than for primary side capacitors.

One of the principal objects of the present invention is to provide an improved power capacitor for use on the secondary side in which the labor cost for making installation is reduced to the barest minimum. In one preferred embodiment of the invention, the power capacitor is in the form of a manually interposable unit which can be very quickly interposed directly between the service meter and the service box or connection box which ordinarily mounts this service meter. This preferred embodiment of power capacitor is of the socket or "plug-in" type, adapted for use with a service meter which is also of the socket or "plug-in" type. In effecting the installations, all that it is necessary to do is firstly to withdraw the socket type of meter from its socket or plug-in type of mounting in the standard service or connection box; secondly to plug in the inner terminal prong side of the capacitor unit into the socket mounting of the box; and thirdly to plug the service meter into the outer socket side of the capacitor unit—whereupon the installation is completed. This installation can be effected with a maximum degree of safety without disconnecting the service line from the distribution transformer, because it is entirely unnecessary for the workman to engage or contact any current carrying element in making the installation.

Another object of the invention is to provide an improved secondary power capacitor which can be readily adapted for mounting on a vertically disposed service box or on a horizontally disposed service box.

Another object is to provide improved thermostatic control means which can be embodied in or associated with the secondary power capacitor, whenever desired. In many of the warmer climates, the load drawn by air conditioning units or apparatus may constitute the major portion of the load, requiring power factor correction. The thermostatic control serves to cut the power capacitor into and out of circuit, depending upon the surrounding or ambient temperature.

Another object of the invention is to provide an improved secondary capacitor unit which can be constructed at a very low cost.

Other objects, features and advantages of the invention will be apparent from the following detailed description of certain preferred embodiments of the invention, taken in connection with the accompanying drawings, in which:

FIGURE 1 is a front elevational view of an electric meter and a meter mounting box at a customer's service entrance, with my improved secondary power capacitor unit mounted between the meter and the box.

FIGURE 2 is a side elevational view, showing to better advantage the interposition of the power capacitor unit between the meter and the box.

FIGURES 3 is a perspective view showing the meter box, capacitor unit and electric meter in the sequence in which they are assembled or plugged into each other.

FIGURE 4 is a front elevational view of the improved capacitor unit;

FIGURES 5, 6 and 7 are fragmentary edge views showing the assembly sequence of the capacitor unit into the meter mounting box, and the meter into the capacitor unit, FIGURE 6 corresponding substantially to a vertical section taken approximately on the plane of the line 6—6 of FIGURE 4;

FIGURE 8 is a detail sectional view taken on the plane of the line 8—8 of FIGURE 9;

FIGURE 9 is a horizontal sectional view taken approximately on the plane of the line 9—9 of FIGURE 4;

FIGURE 10 shows how the capacitor unit can be revolved through substantially 90° to permit horizontal mounting;

FIGURE 11 is a circuit diagram of the electrical connections of the capacitor unit;

FIGURE 12 is a fragmentary front elevational view of a modified embodiment of my improved capacitor unit, showing it mounted along one vertical edge of a standard meter and/or transformer enclosure, usually located at the customer's premises;

FIGURE 13 is a fragmentary plan view of the latter embodiment; and

FIGURE 14 is a fragmentary front elevational view showing this latter embodiment mounted along the top horizontal edge of the standard meter and/or transformer enclosure.

Referring first to the preferred embodiment of the invention illustrated in FIGURES 1 to 9 inclusive, I have shown at 20 a conventional socket or plug-in type of meter mounting box which is generally installed on an outside wall of the customer's house or building, usually at the service entrance where the service or current supply lines enter the building. This meter mounting box 20 is ordinarily constructed with sheet metal front, back, and forwardly extending walls; and in the exemplary embodiment is shown as being of rectangular outline, although it might be of circular or other outline. A pipe or conduit 24 is shown as entering one wall of this meter box 20 for enclosing the supply line conductors and the load conductors extending to the box.

Formed in the front face or wall of such box is a circular socket receptacle 25 which normally receives a socket or plug-in type of electric meter. The socket receptacle 25 is usually surrounded by a clamping bead 27 over which the clamping or sealing band 28 of the meter normally engages. Mounted within this socket receptacle 25 is a group of stationary socket terminals collectively indicated at 30, of which there are usually four for single phase service, two for the line conductors and two for the load conductors, these four socket terminals being designated 30a, 30b, 30c and 30d. In the standard conventional socket receptacle, these terminals are of the spring jaw or female type, so as to receive plug-in terminals of the prong or male type projecting rearwardly from the rear side of the socket type of electric meter adapted for plug-in reception in this socket receptacle 25.

A standard meter of this socket mounted type is indicated at 32, this usually being a watthour meter having current and voltage responsive electromagnets acting upon a rotating disc which operates through gearing to advance pointers 33 over indicating dials 34. However, it will be understood that other types of meters may be used. In the exemplary form of meter disclosed, all of the meter operating mechanism is enclosed within a large cup-shaped glass cover 36 which, at its rear edge, has a peripheral rim 37 which is locked to the base plate 38 of the meter by a releasable locking band 39.

Projecting rearwardly from the back side or base plate 38 of the meter are the aforementioned prong or male type terminals 40, these being separately designated 40a, 40b, 40c and 40d. These are all mounted in insulating bushings 41 having the conventional projecting angles 42. In the conventional mounting of the meter 32 in the socket receptacle 25, the rearwardly facing prong terminals 40a, 40b, 40c and 40d of the meter are merely pushed into the forwardly facing jaw terminals 30a, 30b, 30c and 30d of the socket receptacle 25, and the meter is then clamped and sealed in place by the clamping or sealing band 28.

Referring now to my improved secondary power capacitor, in its preferred embodiment it is in the form of a self-contained unit, designated 45 in its entirety, which is adapted for inter-position between the socket receptacle 25 and the electric meter 32. This capacitor unit comprises a sheet metal housing 46, preferably of oblong rectangular form, which embodies a back wall 47 having two right angle walls 48 and 49 formed integral therewith and facing forwardly respectively from one of the long edges and from one of the short edges of the back wall 47. When the capacitor unit 45 is installed in the upright vertical position shown in FIGURES 1, 2 and 3, the long wall 48 constitutes the left hand vertical side wall of the enclosure, and the short wall 49 constitutes the bottom wall of the enclosure; and when the capacitor unit 45 is installed in the horizontal position shown in FIGURE 9 the long wall 48 constitutes the bottom wall of the enclosure and the short wall 49 constitutes the right hand vertical side wall of the enclosure. These two right angle walls 48 and 49 have inwardly offset lips or lapping flanges 48' and 49' at their forward edges (FIGURE 6) which are overlapped by lips or flanges on the front cover plate or wall, as I shall presently describe. Formed at the center of the back wall 47 is a relatively large circular opening 52 of almost the same size as the circular socket receptacle 25 in the meter mounting box 20. This large opening 52 accommodates the rearwardly projecting prong terminals 50a, 50b, 50c and 50d of the capacitor unit 45 which are adapted for plug-in reception into the jaw terminals 30a, 30b, 30c and 30d of the socket receptacle 25. Located at equally spaced points around the large opening 52 are four small screw holes 53 for receiving the mounting screws of the capacitor unit terminal plate 54, as will be presently described.

The front of the sheet metal housing 46 is closed by a separate front wall 55 which at two of its edges has short rearwardly bent lapping flanges or lips 56 and 57 that are adapted to overlie the inwardly offset lips 48' and 49'. Formed centrally in this front wall or cover plate 55 is a large circular opening 58, which is substantially in alignment with the large circular opening 52 in the rear wall 47. This front circular opening 58 forms the front entrance to a socket receptacle 59 within the front face of the secondary capacitor unit 45. This front socket receptacle 59 is comparable to the socket receptacle 25 provided in the front face of the meter mounting box 20, and has a like arrangement of spring jaw or female terminals therein, designated 60a, 60b, 60c and 60d, which are adapted to receive the prong terminals 40a, 40b, 40c and 40d projecting rearwardly from the meter 32 when the capacitor unit 45 is interposed between the meter 32 and the meter mounting box 20. Projecting forwardly from the front face of the front wall 55, around the front socket opening 58, is an annular rolled bead 62 adapted to receive the meter sealing ring, to be described later.

Referring again to the details of construction of the capacitor unit housing 46, what are ordinarily the top side and the right hand vertical side of the container are closed off by a separate sheet metal housing closure 65 bent into an L-shape, so as to comprise a short horizontal top wall 66 and a long vertical side wall 67. The short top wall 66 comprises inwardly or downwardly bent front and rear flanges 66a and 66b and also an end flange 66c, which fit down and close off the top of the housing on the outer sides of the front, back and left hand side walls, as viewed in FIGURE 1. The long vertical side wall 67 also comprises inwardly bent front and rear flanges 67a and 67b and an end flange 67c which fit over and close off the right hand vertical side of the housing on the outer sides of the back, bottom and front walls 47, 49 and 55. When the capacitor unit is installed in the upright vertical position shown in FIGURE 1, the three overlapping flanges 66a, 66b and 66c form natural water sheds for keeping rain or snow out of what is then the top of the housing. When the capacitor unit is installed in the horizontally disposed position shown in FIGURE 9, the three overlapping flanges 67a, 67b and 67c are then uppermost and form natural water sheds for keeping rain and snow out of what is then the top of the housing.

The front socket terminals 60a, 60b, 60c and 60d of the female type and the rearwardly projecting prong terminals 50a, 50b, 50c and 50d of the male type are all rigidly carried in the capacitor unit 45 in a circular mounting plate 70 which has abutment against the outer surface of the back wall 47, surrounding the large rear opening 52 therein. Projecting forwardly from this mounting plate 70 is an annular rim 72 of about the same diameter and thickness for clamping purposes as the base plate and rim of the electric meter 32. Projecting forwardly from this annular rim 72 is an abutment flange 74 (FIGURE 6) which is adapted to have a tight closure abutment against the back surface of the rear wall 47. For securing this mounting plate or disc 70 against the rear wall 47, the plate or disc 70 is integrally formed with four equally spaced bosses 76 having threaded bores 78 adapted to receive mounting screws 79 passing through the four screw holes 53 in the rear wall 47. These mounting screws 79 can be passed through the screw holes 53 and threaded into the tapped bores 78 with the capacitor unit housing 46 occupying the upright vertical position shown in FIGURES 1 and 2 relative to the circular mounting disc 70, or these mounting screws can be removed and then reinserted into the next threaded bores after the capacitor unit housing 46 has been revolved through 90° into the horizontal position shown in FIGURE 9, relatively to the circular mounting plate 70. In this manner, relative rotation can be effected between the housing 46 and the circular mounting disc 70 so as to permit mounting of the housing 46 in either the vertical or horizontal position, while still retaining the rearwardly facing prong terminals 50a–50d in vertically aligned positions for reception in the vertically aligned spring jaw terminals 30a–30d in the circular socket receptacle 25. An "UP" designating arrow 80 cast in the front face of the circular mounting disc 70 indicates the position which this mounting disc should always occupy.

Each rearwardly projecting prong terminal 50a–50d of the capacitor unit is made coextensive with its associated forwardly facing spring jaw terminal 60a–60d within the front socket receptacle 59. These prong terminals 50a–50d extend forwardly through individual mounting bosses 81 formed integral with the mounting plate 70. Each prong terminal has insulated mounting in its respective mounting boss 81 by front and rear insulating mounting bushings 83 and 84 fitting into the front and rear ends of the boss 77. The rear insulating bushings 84 can be exactly comparable to the insulating bushings 41 of the electric meter, having corresponding projecting insulating angles 85.

The front ends of the prong shanks may have any desired attachment to their respective forwardly facing spring jaw terminals 60a–60d. In the exemplary arrangement shown, each prong shank has an angularly bent end portion 86 through which passes a screw 87 that screws into a threaded bar 88 mounted between the side flanks of the spring jaw terminal 60a, etc.

There are two capacitors 90, 90' in each capacitor unit, these being of rectangular form for mounting in the rectangular end chambers 89 of the housing 46 which project outwardly in opposite directions beyond the front socket receptacle 59. Each capacitor 90, 90' is releasably held in place by a sheet metal retaining bar 91 which engages the end face of the capacitor and has angularly bent apertured lugs 92 through which pass the mounting screws 79. The capacitors are inserted and removed by removing the front housing wall 55. Anchored substantially in the center of the rearwardly bent flange 56 of this front wall 55 is an inwardly extending screw 94. This screw 94 is adapted to pass loosely through an enlarged hole 95 in the inwardly offset lip 48' and to have a nut 96 threaded over it for releasably holding the left hand vertical edge or long flange 56 of the cover plate 55 in place. The opposite edge of the cover plate 55 has an angle clip 97 staked thereto, the inwardly bent leg of this clip having a downwardly extending slot 98 formed therein. (FIGURE 8). This slot is adapted to be slid in an upward direction over a screw 99 which is anchored to the vertical side wall 67 to extend inwardly therefrom. A nut 101 threads over this screw to engage the slotted angle clip 97, and thereby hold the right hand vertical edge of the cover plate 55 in place. The two nuts 96 and 101 are readily accessible through the socket receptacle 59, and removal of these nuts enables the cover plate 55 to be slid downwardly and then withdrawn edgewise so as to open up the entire front of the housing 46 for easy insertion or removal of the two capacitors 90, 90'. The flanges 66b, 66c, 67b and 67c of the L-shaped housing closure 65 may be spot welded or otherwise rigidly secured to the forwardly extending sides 48 and 49 of the back wall 47.

That end of each capacitor 90, 90' which faces the socket receptacle 59 is provided with three terminals recessed into insulating bushings, these terminals being separately designated 105, 106, 107, and 105', 106', 107'.

Referring to the circuit diagram of FIGURE 11, the two upper terminals 105 and 107 connect with the two opposite condenser foils of the upper capacitor 90; and the two lower terminals 105', 107' connect with the two opposite condenser foils of the lower capacitor 90'. Renewable fuses 108, 108' are connected between the terminals 105, 106 and between the terminals 105', 106' respectively. In standard practice the upper coextensive terminal assemblies 30a–60a and 30b–60b are connected with the line conductors 111 and 112 leading in from the supply transformer, and the lower coextensive terminal assemblies 30c–60c and 30d–60d are connected with the load conductors 114 and 115 branching out into the load circuits on the customer's premises. A third conductor 116 usually extends permanently through the meter mounting box 20 on 240 volt circuits, this third conductor not being interrupted by the unplugging of the meter.

The two capacitors 90, 90' are adapted to be connected in shunt across the supply line conductors 111, 112 as soon as the interposable capacitor unit 45 is plugged into the socket receptacle 25 of the meter mounting box 20. This connection may be continuous or permanent, or it may be made subject to the closing and opening of a thermostatic switch carried by the interposable capacitor unit 45. I have shown such a thermally responsive switch in the form of an accessory 120 which may be mounted on the side wall 48 of the capacitor unit housing 46 whenever such thermal control is desired, as for example in warm climates where the air conditioning apparatus or units impose a high inductive motor load on the line. This thermally responsive switch is preferably set to go on and off with the starting and stopping of the conventional air conditioning apparatus, as for example to effect circuit closure at approximately 85° F. and to effect circuit interruption at approximately 75° F., the switch being either externally adjustable or not, as desired. Such switch may be of any desired conventional type and hence I have not shown it in detail; but as representative of one preferred or practical type I have successfully used a so-called "Klixon" switch provided with a suitable sun shield or outer housing. This is secured to the side wall 48 by either riveting, staking or the extension of a short threaded nipple therethrough.

The receptacle terminal 50a receiving potential from supply conductor 111 is connected by conductor 122 to one side of the thermal switch 120, and a conductor 123 extends from the other side of this switch to the terminal 106 mounted on capacitor 90. From here the circuit continues through fuse 108 and terminal 105 to one side or foil surface of capacitor 90. A conductor 124 extends from terminal 105 down to terminal 107' and connects therethrough to one side or foil surface of the other capacitor 90'.

The other receptacle terminal 50b receiving potential from the other supply conductor 112 connects through conductor 125 down to terminal 106' and in turn connects through fuse 108' and terminal 105' to the other side or foil surface of capacitor 90'. A conductor 126 parallels conductor 124 and connects terminal 105' to the other side or foil surface of capacitor 90. Thus, when the interposable capacitor unit 45 is in place, closing and opening of the thermostatic switch 120 will connect and disconnect the two capacitors 90, 90' in parallel relation across the supply conductors 111, 112. The fuses 108, 108', provide protection in the event of either line or ground faults. If desired, internal resistors may be provided to reduce the residual charge to a relatively low voltage, such as 50 volts, in possibly a minute or so after the line potential has been disconnected from the capacitors 90, 90'. As illustrative of the capacitance of the two capacitors 90, 90' in the size of unit shown, these may have a rating of approximately 2 kvar. at 240 volts.

It will be obvious from the foregoing that in the mounting of the secondary capacitor unit the meter 32 is first withdrawn from the socket receptacle 25 of the meter mounting box 20, this usually being effected by removing the conventional sealing band 28, and then pulling the meter straight out of the socket receptacle. Then the secondary capacitor unit 45 is interposed into operative position between the meter and mounting box by plugging the rearwardly projecting terminal prongs 50a–50d of the capacitor unit into the forwardly facing jaw terminals 30a–30d of the mounting box receptacle 25. Following this, the rearwardly projecting prong terminals 40a–40d of the meter are plugged into the forwardly facing jaw terminals 60a–60d of the capacitor unit 45; or alternatively, the meter may first be plugged into the capacitor unit and the combined assembly of the capacitor unit and meter may then be plugged into the socket receptacle 25 of the meter mounting box 20. The completed installation is illustrated in side view in FIGURE 2, from which it will be seen that when the capacitor unit is in place the meter 32 is only caused to project outwardly a relatively short distance beyond its normal position. In most installations, the clamping or sealing band 28, or one similar thereto, is placed over the joint between the front clamping bead 27 on the meter mounting box and the rear clamping rim 72 on the capacitor unit 45. Similarly, another clamping or sealing band 128 is placed over the joint between the front clamping bead 62 on the capacitor unit 45 and the rear clamping rim 37 or locking band 39 of the electric meter 32. These clamping or sealing bands 28 and 128 may be of identical construction, and are old and well known and need not be described in detail; it being sufficient to state that they usually comprise a tightening screw 129 threading through lugs 129' at the ends of the band, by which the band may be contracted or tightened into very firm engagement over the joint. Sealing apertures may be provided in the screw 129 and in the lugs 129' for receiving a sealing wire held in place by an impressed lead seal, as is well known. The centering of the capacitor unit and meter is effected by the bead 27 on the meter mounting box 20 fitting over an annular ledge 73 on the mounting plate 70, and by the annular bead 62 on the front of the capacitor unit fitting into the rearwardly projecting annular lip of the locking band 39 on the meter.

It will be noted that when the capacitor unit is installed in the vertical or upright position shown in FIGURES 1 and 2 the three overlapping flanges 66a, 66b and 66c form water sheds for keeping rain and snow out of the housing.

In FIGURE 10 I have shown a horizontal installation in which the capacitor unit housing 45 has been revolved through 90° relatively to the terminal mounting plate 70. As previously described, this is accomplished by removing the mounting screws 79 and then revolving the housing through 90° relatively to the mounting disc 70, following which the mounting screws are threaded back into the next tapped holes 78. The flexible conductors 122, 123, 125 and 126 are made sufficiently long to accommodate this rotative displacement. The direction of rotation is such as to place the three overlapping flanges 67a, 67b and 67c uppermost for keeping rain and snow out of the housing in such horizontal position. Such horizontal installation is frequently desirable in order to clear an overhanging ledge 130, or to prevent the installation extending upwardly above a particular level. The fact that the terminal mounting plate 70 is not revolved with the housing 46 insures that the socket terminals will remain upright for retaining the electric meter 32 in its normal upright position.

In FIGURES 12, 13 and 14 I have shown a modified embodiment of the invention in which the secondary capacitor unit 45' is embodied in a closed housing 46' which is adapted to have a readily attachable mounting on a standard indoor or outdoor service entrance box 135 that usually encloses the meter and/or transformers, etc. The mounting of this modified capacitor unit 45' is preferably effected by a threaded nipple 137 which projects from the housing 46' and is adapted to be inserted through a knock-out aperture in the entrance box 135, where it receives inner and outer clamping nuts 138 that lock the nipple in place. The conductors which establish connection between the capacitor contained within the housing 46' and the line side leads 111', 112' contained within the entrance box 135 pass through this nipple 137. The thermostatic switch 120' is secured to a lower corner of the housing 46' and cuts the capacitor into and out of circuit with changes of ambient temperature.

The capacitor housing 46' has the same relation of overlapping flanges 66a', 66b' and 66c' for keeping rain and snow out of the housing when it is installed in the upright position shown in FIGURE 12, in which position the nipple 137 enters the side wall of the entrance box 135. Similarly, the capacitor housing has the same relation of overlapping flanges 67a', 67b' and 67c' for keeping rain and snow out of the housing when it is installed in the horizontal position shown in FIGURE 14, in which position the nipple 137 usually enters the top wall of the entrance box 135. It will thus be seen that this modified embodiment of secondary power capacitor can also be installed on the customer's premises with a relatively small expenditure of time.

While I have illustrated and described what I regard to be the preferred embodiments of the invention, nevertheless it will be understood that such are merely exemplary and that numerous modifications and rearrangements may be made therein without departing from the scope of the invention.

I claim:

1. In secondary power capacitor apparatus for ready interposition between an electric meter and its socket receptacle at a customer's premises for correcting lagging power factor in the electrical energy supplied to said premises, the combination of an electrical meter mounting box provided with a socket receptacle having forwardly facing plug-in terminals therein to which the line and load conductors are connected, a socket type of electric meter having rearwardly facing plug-in terminals projecting therefrom normally adapted for reception in the forwardly facing plug-in terminals of said meter mounting box, and a secondary power capacitor unit having plug-in interposition between said meter mounting box and said meter, said power capacitor unit comprising rearwardly facing plug-in terminals for coaction with the forwardly facing plug-in terminals of said meter mounting box, forwardly facing plug-in terminals in said capacitor unit for coaction with the rearwardly facing plug-in terminals of said meter, capacitor means embodied in said capacitor unit, and means including thermostatic switch means carried by said capacitor unit for selectively coupling said capacitor means to at least certain ones of the terminals of said capacitor unit.

2. In secondary power capacitor apparatus for plug-in interposition between an electric meter and its socket receptacle at a customer's premises for correcting lagging power factor in the electrical energy supplied to said premises, the combination of an electrical meter mounting box having a socket receptacle in the front thereof provided with forwardly facing terminals therein to which the line and load conductors are connected, an electric meter of the socket mounted type having rearwardly projecting terminals adapted for plug-in coaction with the forwardly facing terminals of said meter mounting box, and a secondary power capacitor unit adapted for plug-in interposition between said meter mounting box and said meter, said power capacitor unit comprising a terminal mounting member, terminals facing rearwardly from said terminal mounting member for plug-in coaction with the forwardly facing terminals of said meter mounting box, terminals facing forwardly from said terminal mounting member with which the rearwardly facing terminals of said meter having plug-in coaction, a housing carried by said terminal mounting member, capacitor means contained within said housing, means for coupling said capacitor means to at least certain of the terminals carried by said terminal mounting member, and a rotative joint between said terminal mounting member and said housing permitting rotative movement of said housing relatively to said terminal mounting member.

3. In secondary power capacitor apparatus of the class described for ready installation at a customer's electrical service inlet for reducing lagging power factor in the electrical energy supplied to said service inlet, the combination of an electrical meter mounting box for the customer's electrical service inlet having line and load terminals therein, a power capacitor unit comprising a rectangular housing, capacitor means in said housing, means in said power capacitor unit for coupling said capacitor means to the line terminals in said box, selective mounting means enabling said housing to be mounted selectively on said box with said housing disposed either substantially vertically or substantially horizontally to accommodate different installation requirements at said service inlet, weather shedding flange means for closing off the top of said housing when it is mounted in its vertical position, and weather shedding flange means for closing off the top of said housing when it is mounted in its horizontal position.

4. In secondary power capacitor apparatus of the class described for installation at a customer's electrical service inlet for reducing lagging power factor in the electrical energy supplied to said service inlet, said service inlet being of the type wherein an electrical meter of the socket type is normally adapted to have plug-in reception within the socket receptacle of the socket type of meter mounting box, the combination therewith of a secondary power capacitor unit adapted to be mounted in a position interposed between said electric meter and said meter mounting box, said capacitor unit housing including rectangular back plate, rearwardly facing terminals projecting rearwardly from said back plate for plug-in reception in the terminals of the socket receptacle of said meter mounting box, side walls extending forwardly from two edges of said back plate for closing two sides of said housing, an L-shaped closure member for closing the other two sides of said housing, a removable front closure plate closing the front side of said housing, a socket receptacle entering through said front closure plate, forwardly facing terminals in said latter socket receptacle adapted for the plug-in reception of said electrical meter, said forwardly facing terminals being aligned with and electrically connected with their respective rearwardly facing terminals, capacitor means positioned within said housing, and means for electrically intercoupling said capacitor means with at least certain ones of said capacitor unit terminals.

5. In secondary power capacitor apparatus of the class described for ready installation at a customer's electrical service inlet for reducing lagging power factor in the electrical energy supplied to said service inlet, the combination of an electrical meter mounting box having a socket receptacle in the front thereof provided with forwardly facing jaw terminals therein to which the line and load conductors are connected, an electric meter of the socket mounted type having rearwardly projecting prong terminals adapted for plug-in coaction with the forwardly facing jaw terminals of said meter mounting box, and a secondary power capacitor unit adapted for plug-in interposition between said meter mounting box and said meter, said power capacitor unit comprising a terminal mounting plate, prong terminals facing rearwardly from said terminal mounting plate for plug-in coaction with the forwardly facing jaw terminals of said meter mounting box, jaw terminals facing forwardly from said terminal mounting member with which the rearwardly facing prong terminals of said meter have plug-in coaction, said jaw terminals and said prong terminals carried by said terminal mounting plate being in alignment with each other and electrically connected together, a housing carried by said terminal mounting plate, capacitor means contained within said housing, means for electrically intercoupling said capacitor means with at least certain of the terminals carried by said terminal mounting plate, said capacitor means having adequate capacitance to effect substantial correction to lagging power factors in the electrical energy supplied to said service inlet, a rotative joint between said terminal mounting plate and said housing permitting rotative movement of said housing relatively to said plate between substantially vertical and substantially horizontal positions of said housing, a first annular bead projecting forwardly from said meter mounting box around the socket receptacle therein, a rearwardly disposed first annular flange carried by said terminal mounting plate, a first clamping band engaging over said first annular bead and over said first annular flange to clamp said capacitor unit to said meter mounting box, a second annular bead projecting forwardly from the housing of said power capacitor unit, a rearwardly disposed second peripheral flange carried by said electric meter, and a second clamping band engaging over said second annular bead and said second peripheral flange to clamp said electric meter to said capacitor unit.

6. In secondary power capacitor apparatus of the class described for ready installation at a customer's electrical service inlet for reducing lagging power factor in the electrical energy supplied to said service inlet, the combination of an electrical meter mounting box having a socket receptacle in the front thereof, said meter mounting box having the line and load conductors entering therein, a pair of upper jaw terminals and a pair of lower jaw terminals in said socket receptacle, said upper jaw terminals being connected to the supply line conductors entering said box, said lower jaw terminals being connected to the load conductors entering said box, an electric meter of the socket mounted type having upper and lower pairs of rearwardly facing prong terminals projecting therefrom and positioned for reception in said upper and lower pairs of jaw terminals, a secondary power capacitor unit mounted in interposed relation between said meter mounting box and said meter, said power capacitor unit comprising a housing, a pair of upper prong terminals and a pair of lower prong terminals projecting rearwardly from said housing and positioned for plug-in reception in the respective pairs of upper and lower jaw terminals of said meter mounting box, a socket receptacle in the front side of said power capacitor unit housing, a pair of upper jaw terminals and a pair of lower jaw terminals in said latter socket receptacle positioned for plug-in reception of the respective pairs of rearwardly facing prong terminals on said meter, said pairs of upper and lower jaw terminals and said pairs of upper and lower prong terminals carried by said capacitor unit being disposed substantially in alignment and electrically connected together, capacitor means disposed within said housing, and circuit means including at least one fuse for electrically intercoupling said capacitor means and said latter pair of upper jaw terminals.

7. In secondary power capacitor apparatus of the class described for ready installation at a customer's electrical service inlet for reducing lagging power factor in the electrical energy supplied to said service inlet, the combination of an electrical meter mounting box having forwardly facing plug-in terminals therein to which the line and load conductors are connected, a socket type of electric meter having rearwardly facing plug-in terminals projecting therefrom normally adapted for reception in the forwardly facing plug-in terminals of said meter mounting box, and a secondary power capacitor unit having plug-in interposition between said meter mounting box and said meter, said power capacitor unit comprising a housing having a rear wall, side walls projecting forwardly from the sides of said rear wall, a removable front wall closing the front side of said housing, said front wall having a socket receptacle therein, forwardly facing plug-in terminals in said socket receptacle adapted for the plug-in reception of the rearwardly facing terminals of said meter, rearwardly facing plug-in terminals carried by said housing and adapted for plug-in reception in the forwardly facing plug-in terminals carried by said meter mounting box, said forwardly and rearwardly facing terminals carried by said housing being substantially in alignment and electrically connected together, capacitor means within said housing, means for electrically intercoupling said capacitor means with at least certain of the terminals carried by said housing, a rearwardly extending flange along one side edge of said removable front wall, a first fastening screw projecting inwardly from said flange and adapted to pass through an aperture in the adjacent side wall of said housing, a second fastening screw projecting inwardly from the opposite side wall of said housing, a bracket secured to the adjacent inner edge of said front wall and having a vertical slot therein adapted to have said second fastening screw pass therethrough, and first and second nuts threading over said first and second fastening screws, with both of said nuts being accessible for mounting or removal thereof through the socket receptacle in the front wall of said capacitor unit.

References Cited in the file of this patent

UNITED STATES PATENTS

| | | |
|---|---|---|
| 898,771 | McGowan | Sept. 15, 1908 |
| 1,482,891 | Ghegan | Feb. 5, 1924 |
| 2,249,075 | Young | July 15, 1941 |
| 2,259,359 | Thompson | Oct. 14, 1941 |
| 2,545,228 | Cranfill | Mar. 13, 1951 |
| 2,606,232 | St. John | Aug. 5, 1952 |
| 2,740,905 | Henderson | Apr. 3, 1956 |
| 2,760,124 | Glassburn | Aug. 21, 1957 |